Oct. 19, 1965   D. E. ATKINSON   3,213,439
LEVEL INDICATING DEVICE WITH HIGH FREQUENCY RESONANT PROBE
Filed Feb. 16, 1962   2 Sheets-Sheet 1
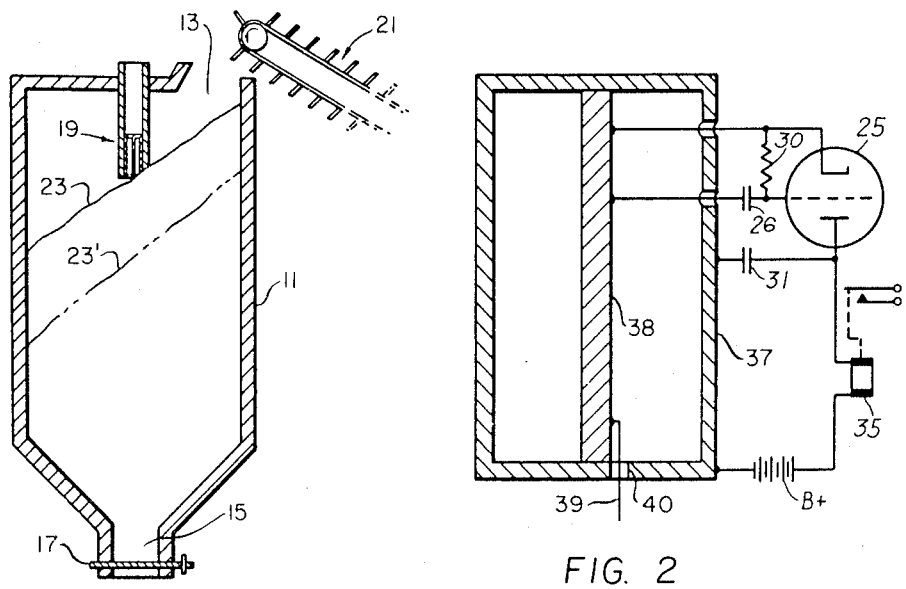
FIG. 1
FIG. 2
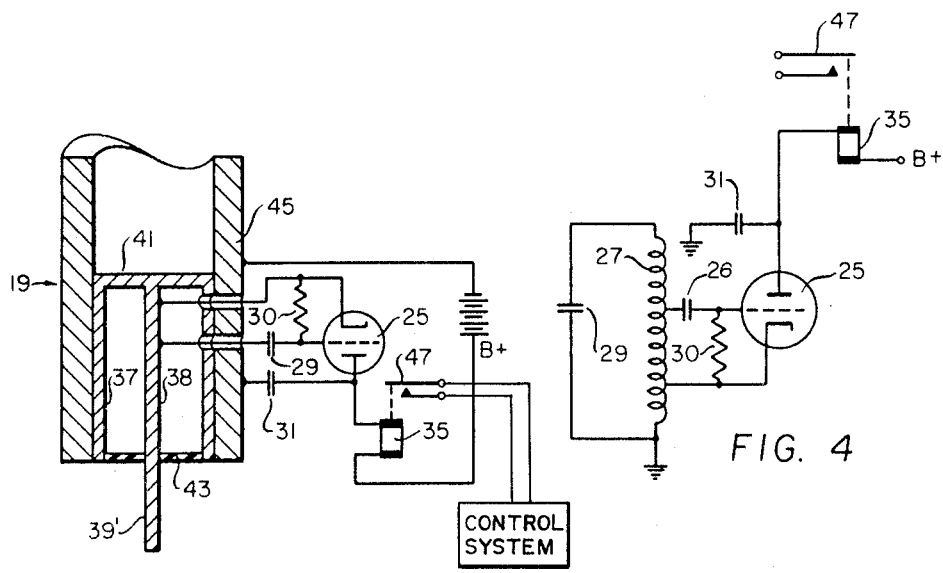
FIG. 3
FIG. 4
INVENTOR.
Duane E. Atkinson
BY
Flehr and Swain
Attorneys Oct. 19, 1965  D. E. ATKINSON  3,213,439
LEVEL INDICATING DEVICE WITH HIGH FREQUENCY RESONANT PROBE
Filed Feb. 16, 1962  2 Sheets-Sheet 2

INVENTOR.
Duane E. Atkinson.
BY
*Flehr and Swain*
ATTORNEYS.

United States Patent Office 3,213,439
Patented Oct. 19, 1965

3,213,439
LEVEL INDICATING DEVICE WITH HIGH
FREQUENCY RESONANT PROBE
Duane E. Atkinson, 102 Fey Drive, Burlingame, Calif.
Filed Feb. 16, 1962, Ser. No. 173,702
5 Claims. (Cl. 340—244)

This invention relates generally to level indicating devices and more particularly to devices suitable for use in storage containers for aggregate materials such as rock, crushed rock and sand, wherein rugged indicating means are particularly advantageous.

In the use of storage containers, there are many applications wherein both filling and emptying are done in less than full container lots. It is, consequently, desirable to have an indication of the amount of material in the container. Numerous devices have been employed as means for determining the actual amount of material in containers or; alternatively, when the level in a given container reaches a particular point. For the most part these means have been inadequate in that they are relatively fragile and rely on moving parts to indicate the level.

It is, therefore, a general object of this invention to provide an improved level indicating device.

It is a more particular object of this invention to provide a level indicating device which is relatively inexpensive and rugged.

It is another object of the present invention to provide a level indicating device which employs as the sensing probe a high frequency resonant element.

It is a further object of this invention to provide a level indicating device of the above character which employs as a sensing probe an open ended resonant coaxial cavity.

It is still another object of this invention to provide a probe which may be used for detecting the level of aggregate or other media.

These and other objects of the invention will become more clearly apparent upon reading the following description in conjunction with the accompanying drawing, in which:

FIGURE 1 is a cross sectional view of a container employing a level indicating device in accordance with the invention;

FIGURE 2 is an equivalent high frequency circuit for a level indicating device in accordance with the invention;

FIGURE 3 is a schematic diagram of a level indicating device in accordance with the invention showing a coaxial line sensing probe in section;

FIGURE 4 is a schematic diagram of an equivalent of an actual circuit utilized in the invention;

Figure 5:
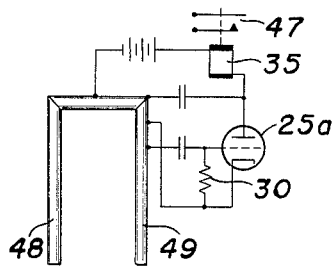
FIGURE 5 is a schematic diagram of a level indicating device in accordance with the invention which employs as a sensing probe a transmission line.

Referring particularly to FIGURE 1, the container 11 is shown having a filler opening 13 and a dispenser opening 15 provided with a gate 17. A level indicating device 19 is secured to the upper portion of the bin or container for indicating the level of material with the container itself. A filling device 21 for the container 11 may be employed in conjunction with the indicating device 19 to maintain the contents of the container at a given level, as shown, for example, by the solid line 23.

In operation, when the level falls, for instance, as shown on dotted line 23', the level indicating device 19 provides a signal which can be employed to control the filling device 21 whereby filling operations commence. After sufficient material has been added to the container to raise the level as indicated at line 23, the indicating device 19 provides a signal which can be employed to stop the filling operation.

In general, the electronic portion of the invention may be described in connection with FIGURE 4 which is an equivalent diagram of an actual circuit. As seen in the diagram, the electron tube 25 is connected in a Hartley type oscillator circuit employing an inductor 27 and the capacitor 29. The cathode of the tube 25 is connected directly to a portion of the inductor 27, while the grid is capacitively coupled by capacitor 26 to an intermediate point on the inductor 27. The plate of the tube is by-passed to ground through capacitor 31. The plate circuit of the tube includes a relay coil 35 and a voltage source B+. The values of the elements of the circuit are chosen so that it will oscillate in the ultra-high frequency range. During oscillation, a bias voltage is developed across the resistor 30 which causes class C operation of the tube. During class C operation, the average plate current is relatively low. The parameters are selected so that the average plate current is less than that required to operate the relay.

When the material in the container rises and is either in close proximity to or in contact with the probe as will be presently described, the tuned circuit is loaded and oscillations stop. The voltage across the resistor 30 is reduced to zero, thereby reducing the bias of the tube to zero. The plate current increases and the relay operates.

Referring to FIGURE 2, a diagram, partly schematic, illustrates an equivalent high frequency circuit. The vacuum tube 25, capacitor 31, relay coil 35, resistor 30 and power source B+ are the same as in the circuit of FIGURE 4. In place of the resonant circuit of FIGURE 4 a coaxial resonant cavity is utilized. The cavity includes an outer cylindrical conductor 37 and an inner conductor 38, and thus may be formed of a length of coaxial transmission line, shorted at both ends. The length of the outer and inner conductors are chosen to be a half wavelength long electrically at the desired frequency. An antenna 39 is connected to the inner conductor and extends out through the opening 40 formed in the cavity.

In normal operation the antenna 39 does not substantially load the cavity and it will act as a resonant circuit for the oscillator which will operate class C and the plate current is below that required to operate the relay. When material such as aggregate is located close to the antenna, energy from the cavity is radiated to the aggregate and thus the aggregate itself provides loading which is both resistive and reactive. As soon as the cavity is loaded by the antenna, oscillations terminate and relatively high plate current flows. The relay is operated.

A major problem with the circuit just described is that dust, moisture and the like will provide a relatively short leakage path between the antenna and the adjacent cavity. This leakage path will load the cavity and cause operation of the relay even though the material may not be in contact with the antenna to load it. Thus, an indicating device of this type, while useful in many applications, is not suitable in an environment that has high moisture or excessive foreign matter such as dust, etc.

In place of the resonant circuit of FIGURE 2, coaxial transmission line shorted at only one end to form a coaxial resonant cavity may be utilized. Referring to FIGURE 3, the line includes an outer conductor 37 and an inner conductor 38. The length of the outer conductor is chosen to be approximately one-half wave length at the desired frequency of oscillation. The length of the inner conductor 38 is chosen to be approximately three-quarters of a wave length at the desired frequency, the inner conductor also acts as the antenna. Alternatively, the length of the outer conductor 37 may be any even numbered quarter wave length of the desired frequency with the length of the inner conductor being one-quarter wave length greater.

One end of the line is shorted by a plate 41, while the other end is left open. Means 43, which may be plastic or other insulating material, may be employed to seal the space between tube section 37 and the center section 38. The cathode, grid and plate of the tube 25 are connected to the transmission line, as indicated, with the cathode and grid being connected to the inner conductor 38 and the plate being connected to the outer or ground conductor 37. The entire probe assembly may then be placed within a rugged member such as a piece of iron pipe 45. Thus, the probe within the container 11 is of highly rugged construction so that it can be used to sense the level of sand, gravel and aggregate.

In resonators of the coaxial transmission line type having one end shorted, electromagnetic fields are sustained between the inner conductor 38 and the outer conductor 37. The fields are not constant throughout the length of the line. Rather, the fields are zero at the beginning of a line (at the shorted end) and at each even numbered quarter wave length therefrom. On the other hand, the fields are a maximum at odd numbered quarter wave lengths. The collection of dust on the surface of sealing material 43 will have little, or no, effect on the operation of the device since the fields are minimum at this point and the path length is relatively long. Thus, there is negligible loading of the cavity. By using the inner conductor 38 as the antenna 39' there is no need to provide a lead through the cavity.

In normal operation with no material in the proximity of that portion of the inner conductor 38 extending beyond the outer conductor 37, the probe will act as the resonant circuit of FIGURE 4. Thus, high frequency oscillations will occur as the oscillator operates class C. As soon as the material contacts the antenna the grid bias is reduced to zero, high plate current flows and the relay is activated.

Referring to FIGURES 1 and 3, as the level of material rises, it reaches a point where the fields extending between the inner conductor 38 to the outer conductor 37 are interrupted. The resonant circuit is loaded, the oscillations are interrupted, the voltage on resistor 30 decreases, and the current through the tube 25 increases. The relay 35 is operated. The switching element 47 associated with the relay 35 may activate an alarm system or may activate a control system for controlling the filling and emptying of the container or bin.

In FIGURE 5, there is shown a level indicating device of the type shown in FIGURE 3 which employs as the resonant probe a transmission line of the type having the individual lines or conductors 48 and 49, rather than of the coaxial type. As is well known, a transmission line of the foregoing character will serve to sustain standing waves between spaced conductors 48 and 49. By adjusting the electrical length of the line as, for example, by making a line which is one-quarter wave length long at the operating frequency, it acts as a resonant element. A resonant transmission line of this type, however, will be more sensitive than the antenna employed in FIGURE 3 due to the fact that the field is concentrated between the lines 48 and 49. In the configuration shown in FIGURES 2 and 3 the field extends in an array from the antennas 39 or 39' to the ground plane determined by the lower end of the cavity.

The various circuit components shown in FIGURE 5 carry the same reference numbers as corresponding elements in FIGURE 3. The circuit operates in the same manner. When the resonant transmission line is detuned, the oscillator ceases to oscillate, the grid achieves a zero bias and the tube conducts relatively high currents which serve to energize the relay 47.

Level indicating devices of the type described above, give good indications of level. However, the loading of the circuit may be predominately reactive when considering aggregate with a usual amount of moisture. Due to the high dialectric constant of the moisture, the loading will then be principally capacitive and the oscillator may accommodate to a new frequency of operations as material approaches the resonant transmission line. Furthermore, the device is sensitive to changes in the dimensions of the resonant line whereby the oscillating frequency of the oscillator shifts.

Figure 6:
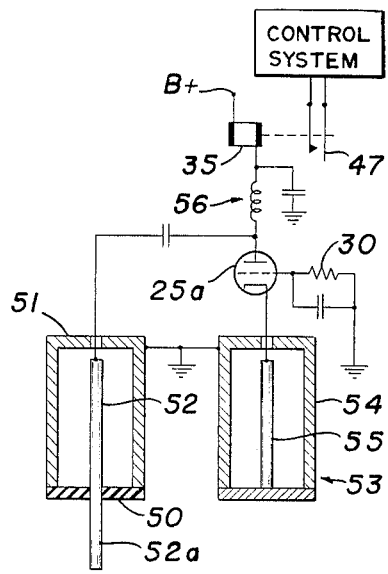
FIGURE 6 is a schematic diagram of another level indicating device in accordance with the invention which incorporates two high frequency resonant elements.

In FIGURE 6, there is shown another embodiment of the invention which employs a pair of high frequency resonant elements, one in the plate circuit of the device and the other in the cathode circuit. A device of this type is less sensitive to change in dimension such as by temperature and the like. Both of the resonant circuits, if constructed in a similar manner, will shift in the same direction thereby shifting the overall resonant frequency of the oscillator yet maintaining a relatively sharp tuning curve whereby slight disturbances of one of the cavities will cause the circuit to cease oscillations.

In the circuit of FIGURE 6, elements bear the same reference numerals as hereinbefore used. However, the circuit is of the tuned plate-tuned cathode configuration with the plate circuit including a resonant coaxial cavity 51 having a center conductor 52 which extends outwardly to form the antenna 52a of the type previously described. A cap 50 of insulating material seals the cavity against dust. The cathode circuit includes a closed resonant cavity 53 having an outer conductor 54 and a center conductor 55 connected to the cathode. The length and dimensions of the cavities are selected such that, in the absence of material, they are resonant at the same frequency. A high frequency choke circuit 56 may be connected between the tube 25a and the relay 35.

The circuit of FIGURE 6 operates in the same manner as the circuits previously described. When the antenna or probe 52a is adjacent material, the loading on the cavity 51 will serve to detune the same. Since the cathode is in a different tuned circuit there is no possibility of a shift in the oscillating frequency to accommodate the loading. The oscillator will cease to oscillate. As soon as oscillations cease, the voltage on th grid element of the tube 25a is such that the tube will conduct relatively high D.-C. currents which serve to activate the relay 35.

Figure 8:
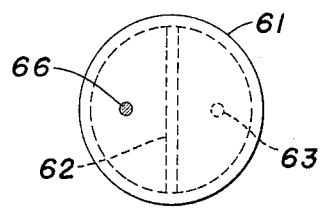
FIGURE 8 is a view taken along the line 8—8 of FIGURE 7.
Figure 7:
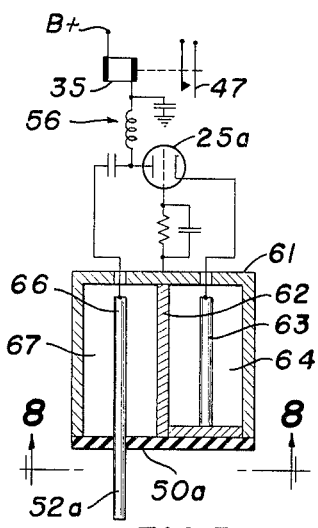
FIGURE 7 is a sectional view of a level indicating device of the type shown in FIGURE 6 with the resonant high frequency elements incorporated in a single member.

Resonant circuits of the type shown in FIGURE 6 may be incorporated in a single sensing probe such as that shown in FIGURES 7 and 8 which comprises a cylindrical outer member 61 partitioned by a wall 62. An inductive element 63 is disposed within the closed cavity 64 formed between the walls of the cylinder 61 and the partition 62 to form the first resonant cavity corresponding to the cavity 53 of FIGURE 6. A second element 66 extends into the other cavity 67 formed by the cylindrical member 61 and the wall 62 and extends outwardly to form an antenna section 52a, this combination corresponds to resonant probe 51 of FIGURE 6. A cap of insulating material 50a serves to seal the cavity 67 against dust but may extend across the closed cavity 64 for ease in manufacture.

The probe of FIGURE 7 is relatively rugged and may be employed in conjunction with aggregate and like materials. Furthermore, the probe is retalively simple and inexpensive in construction.

The overall system shown in FIGURES 6, 7 and 8 is a highly sensitive system which will serve to detect changes in impedance on the probe 52a. In contrast with the previous probes which depended upon changes in resistance or loading to detune the oscillator, the probes shown in FIGURES 6, 7 and 8 are sensitive both to resistive loading as well as reactive loading.

Figure 9:
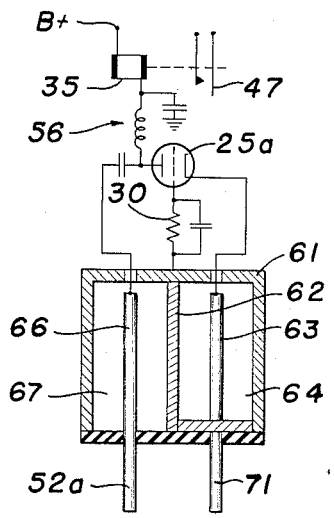
FIGURE 9 is a schematic diagram showing a modified embodiment of the level indicating device shown in FIGURE 7.

The sensitivity of the probe shown in FIGURES 7 and 8 may be further increased as shown in FIGURE 9 by adding an additional conductive element 71 which, in conjunction with the antenna 52a, forms a transmission line detuned by material between the probes 52a and 71. Since the cavity 64 is completely closed, the element 71 will have no effect on that cavity.

Thus, it is seen that there is provided a relatively rugged, improved level indicating device which employs high frequency resonant probe circuits. In each case the resonant circuit is a transmission line, either coaxial or of the parallel line type and with either one or both ends shorted.

This application is a continuation-in-part of copending application Serial No. 97,894, filed March 23, 1961, entitled "Level Indicating Device" (now abandoned).

I claim:

1. A level indicating device comprising an oscillating circuit, the resonant portion of said oscillating circuit including a section of transmission line, said transmission line including an outer conductor having an equivalent length equal to an even numbered quarter wave length at the desired frequency of oscillation and an inner conductor having an equivalent length one quarter wave length longer than the outer conductor, the inner conductor and the outer conductor being shorted at the receiving end of the line, the output of said oscillating circuit including means for attenuating current during oscillaiton of said oscillataing circuit, and means responsive to high output current from said oscillating circuit for indicating the loss of oscillation.

2. A level indicating device as defined in claim 1 wherein the end opposite the receiving end is electrically open and electrically non-conductive means completely seal the transmission line between its outer conductor and inner conductor at the open end thereof.

3. A level indicating device comprising an oscillating circuit having a predetermined frequency of operation, said oscillating circuit including a section of coaxial transmission line having a shorted end and an amplifying device having two current carrying electrodes and a control electrode, said coaxial transmission line including an outer conductor having an equivalent length equal to an even number of quarter wave lengths at the frequency of oscillation and a center conductor having an equivalent length one-quarter wave length longer than the outer conductor, one of said current carrying electrodes being coupled to the center conductor of said coaxial line near the shorted end thereof, the other of said current carrying electrodes being coupled to the outer conductor of said coaxial line, the control electrode being coupled to the center conductor at a point spaced from the ends thereof having a signal at said frequency of operation, a bias resistance connected between said one of said current carrying electrodes and the control electrode, and current responsive indicating means coupled to one of said current carrying electrodes for indicating loss of oscillation.

4. A level indicating device comprising first and second oscillating circuits having a predetermined operating frequency, each including an outer conductor and a center conductor to define a transmission line, an amplifying device having first and second current carrying electrodes and a control electrode, the first of said current carrying electrodes being coupled to the center conductor of the first oscillating circuit and the second of said current carrying electrodes being coupled to the center conductor of the second oscillating circuit, said control electrode being coupled to the outer conductor of each of said oscillating circuits, the center conductor of one of said first and second oscillating circuits projecting one-quarter wave length at said operating frequency beyond the outer conductor, a bias resistance coupled between one of said current carrying electrodes and the control electrode, and current responsive indicating means coupled to one of said current carrying electrodes for indicating loss of oscillation.

5. A level indicating device as in claim 4, wherein the outer conductors of said first and second oscillating circuits are formed in part by a cylinder.

References Cited by the Examiner

UNITED STATES PATENTS

| 2,157,855 | 5/39 | Koch | 331—101 |
| 2,467,736 | 4/49 | George | 331—101 |
| 2,483,189 | 9/49 | Eaglesfield | 331—101 |
| 2,558,463 | 6/51 | Reed | 325—128 |
| 2,619,634 | 11/52 | Isely | 331—101 |
| 2,720,624 | 10/55 | Gunst et al. | 317—146 |
| 2,782,308 | 2/57 | Rug | 317—146 |
| 2,821,630 | 1/58 | Dehn | 331—101 |
| 2,990,482 | 6/61 | Kenny | 340—244 |
| 2,013,256 | 12/61 | Damast | 340—244 |

FOREIGN PATENTS

| 697,253 | 9/53 | Great Britain. |
| 581,175 | 8/59 | Canada. |

NEIL C. READ, *Primary Examiner.*

BENNET G. MILLER, *Examiner.*